3,655,872
HIGHLY ATTENUATED RUBELLA VIRUS VACCINE AND PRODUCTION THEREOF
Reisaku Kono, Tokyo, Shigeo Yamamoto, Yamaguchi, and Hideaki Yaoi, Nara, Japan, assignors to Takeda Chemical Industries, Ltd., Osaka, Japan
No Drawing. Filed Apr. 1, 1969, Ser. No. 812,385
Int. Cl. C12k 5/00
U.S. Cl. 424—89                                2 Claims

ABSTRACT OF THE DISCLOSURE

A novel, highly attenuated live rubella vaccine is prepared by subjecting a specific rubella virus strain to at least 10 passages of cultivation in tissue containing living cells of a warm blooded animal at 28° C. to 36° C. until the desired degree of attenuation is attained.

---

This invention relates to a highly attenuated live rubella vaccine which is not only novel and effective but also further attenuated, i.e. far less in side-effects, than those which have been hitherto on trial.

Rubella is a measles-like infectious disease caused by the infection of rubella virus; that is characterized by slight fever, skin eruption and lymphadenopathy which appear after an incubation period of a few weeks. While rendering no serious symptoms in case of infants and children, the disease tends to be severer in adults with accompaniment of arthritis, arthralgia or the like. Particularly when pregnants suffer from this disease at an early stage of the pregnancy, the infection extends beyond the placenta to fetus, resulting baby with the congenital rubella syndrome, such manifestations as cataracts, congenital heart failure and hearing difficulty, at high rate. Moreover, there is observed a tendency that extensive outbreaks of rubella occur periodically. Therefore, the development of an effective control measure of rubella has been a desideratum among physicians.

It goes without saying that the rubella is desirably to be controlled by any means, and a possibility of rubella vaccination has been extensively investigated after the discovery of rubella virus by Weller et al. and Parkman et al. in 1962. As the results, it has hitherto been succeeded in allowing a rubella virus to propagate in a mammalian or fowl embryonic tissue culture, and it has also been shown that the rubella virus can be attenuated through serial passages in said culture to a grade of virulence which permits the inoculation to humans as a live attenuated vaccine and renders the immunity to the vaccines without serious side effects.

It has been clinically approved that when an attentuated live rubella vaccine is inoculated into human infants and children, the corresponding antibody response can be elicited without giving untoward clinical reactions, and also that those who have acquired the antibody can be protected against suffering from rubella. The rubella virus is occasionally recovered from the throat of the vaccinees in laboratories, but it is known that the contact infection has never been found in susceptible children and adults living near by, since the contacts have never shown clinical attack of German measles and serological evidence of rubella virus infection.

On the other hand, however, when the hitherto-known attenuated live rubella virus vaccines are inoculated into adults, particularly into women of childbearing age, the reactions are different from those of infants and children, and there are observed frequently so-called rubella-like symptoms such as fever, malaise, skin eruption, arthritis, arthralgia and the like. Therefore, there still remains a difficult problem in inoculating the known attenuated live rubella virus vaccines into susceptible adults.

Moreover, it is not known whether the known vaccine is completely devoid of teratogenicity or fetal toxicity for the offspring, when it is inoculated into the pregnants.

During the present inventors' comparative investigations on biological behaviors of many rubella virus strains of various passage histories, some being isolated by them and others being contributed by other researchers in the world, they have found that some congenital abnormalities similar to the congenital rubella syndrome observed in humans are produced in the offspring by inoculating the doe with a rubella virus at an early stage of its pregnancy.

The present inventors further noted that among those rubella viruses tested, rubella virus, Strain To–336, one of those which had been isolated by one of the present inventors, shows substantially no fetal toxicity not only in rabbits but mice and rats (refer to Tests 1 and 2 detailed hereinafter). Proceeding attenuation of this strain, they finally succeeded in producing a highly attenuated rubella virus vaccine which does not give such undesirable side effects against human adults as mentioned above.

The principal object of the present invention is therefore to provide a highly attenuated live rubella virus vaccine which is novel and effective but does not produce, after vaccinated, the rubella-like symptoms and the teratogenicity or the fetal toxicity, both having been difficult to be completely eliminated from the hitherto known rubella virus vaccines.

Another object of this invention is to provide a method for the production of said novel and effective, highly attenuated live rubella virus vaccine with ease and at an economically realizable cost.

Further object of the present invention is to provide an effective and safer immunological measure for preventing human adults, particularly women of childbearing age, from rubella virus infection without the teratogenicity or the fetal toxicity and untoward reactions.

Said objects are realized by subjecting rubella virus Strain To–336 passaged at least 10 times through per se known means to further passages of cultivation in a tissue culture prepared from a warm-bloooded animal at a temperature of about 28° C. to about 36° C., until sufficiently attenuated.

The rubella virus Strain To–336 has been isolated by one of the present inventors from a throat swab of a girl suffering from German measles in Japan and its subculture has been deposited at American Type Culture Collection, Maryland, U.S.A. under the accession number of ATCC–VR–553.

For example, Strain To–336 is inoculated in a tissue culture containing suitable primary cells of a warm-blooded animal, and is incubated stationarily or rotationally at a temperature between about 28° C. and about 36° C. (usually about 29° C. to about 32° C.) for about 5 to about 10 days (usually about one week), and the propagated virus is then transferred into a fresh tissue culture containing such primary cells as mentioned above for the subsequent passage of cultivation. As such passage is repeated successively, the attenuation proceeds rapidly. The cells for the tissue culture are suitably chosen among tissues of cells of warm-blooded animals, i.e. mammals and fowls, and are exemplified by primary kidney cells of various animals (such as monkeys, bovines, pigs, rabbits and dogs), embryo cells of various poultries (such as chickens or ducks) and the like.

Also, for carrying out the serial passages of cultivation, there may be employed human fetal diploid cell cultures.

Alternatively, Strain To–336 is inoculated in the amniotic cavity of an embryonated egg (e.g. on the 7th or 8th day of hen's egg or duck's egg) and incubated at a temperature of from about 30° C. to about 36° C. for about 7 to about 10 days. The inoculated amnion is then removed aseptically, and triturated in a suitable medium such as Hanks' balanced salt solution (detailed below) or the like to prepare about 10% suspension, followed by centrifugation to separate the supernatant fluid. The supernatant fluid contains propagated virus, and can be subjected to the subsequent passage of cultivation in the same manner as mentioned above, whereby the attenuation rapidly proceeds.

For the new passage of cultivation with a tissue culture or an embryonated egg, the culture fluid of the preceding passage is usually diluted about 10 times by volume and the diluted fluid is employed as the seed virus to be inoculated. However, if desired, use may be made of a non-diluted culture fluid, or the so-called limiting dilution method may be occasionally applied. The passage or passages with amniotic cavity may be subsequently followed by the passage or passages with a tissue culture containing the primary cells of a warm-blooded animal or the human diploid cells, and vice versa.

In the culture medium for conducting a passage of cultivation, there may be added an antibiotic or antibiotics such as streptomycin, dihydrostreptomycin, neomycin or penicillins so that the culture may be prevented from the propagation of adventitious microorganisms by an accidental contamination.

In such a manner, rubella virus Strain To–336 is repeatedly subjected to the passages of cultivation until it is confirmed that the virus has sufficiently been attenuated, by a tentative inoculation into seronegative human body susceptible to rubella virus.

Thus attenuated Strain To–336 is used as the seed virus for the production of the highly attenuated rubella virus vaccine of the present invention. The seed virus is inoculated in a culture system selected from those which were explained above as usable for the attenuation passages. The choice may be directed to the same system as, or a different system from, the system or systems used for the attenuation of the seed virus. In the case where a tissue culture is chosen for the production of the vaccine, it is recommended that the virus is allowed to propagate in a culture medium containing none of such substances that may act as an antigen when the resulting vaccine is inoculated into human body.

From the culture fluid thus obtained, solid matters such as cells, cell fragments or the like are removed, for example, by means of filtration or centrifugation, and the filtrate or the supernatant fluid can be used, as the product of the present invention, per se or diluted with a suitable diluent such as a physiological salt solution or distilled water, depending on its virus titer.

While the highly attenuated rubella virus vaccine thus produced is ready for use, it can be preserved in a frozen form with or without addition of one or more stabilizing agents such as sucrose, lactose, glutimates, phosphates and the like. Alternatively, it may be lyophilized with or without addition of one or more of stabilizing agents such as human serum albumin, gelatin and the like for its storage, and the lyophilized product is dissolved upon its use with a suitable diluent such as physiological salts solution or sterile distilled water.

For a satisfactory vaccination, it will be required to inoculate at least $10^{2.0}$ $InD_{50}$ (50% interfering dose) of virus titer per person, preferably subcutaneously for all at once. Particularly preferable dose is about $10^{2.5}$ to $10^{3.5}$ $InD_{50}$. A dose higher than this does not give any danger of undesirable side-effects because of the high safety of the vaccine presented here, but it will be meaningless to use so high dosage since there is not expected any particular increase in the desired vaccination effect.

For the subcutaneous inoculation, a dose of the necessary virus titer is to be contained in an aqueous composition of about 0.1 to about 1.0 ml., desirably 0.25 to 0.5 ml., in volume. Thus, the vaccine of the present invention is to be adjusted, at the use, so as to comprise the highly attenuated rubella virus Strain To–336 in a rubella virus titer of at least $10^{2.0}$ $InD_{50}$/ml., desirably about $10^{2.5}$ to $10^{4.5}$ $InD_{50}$/ml., and physiologically acceptable carrier therefor.

When the highly attenuated rubella virus vaccine thus produced is inoculated into infants and chlidren, there is subsequently observed a remarkable elevation of the antibody level in serum which will prevent them from infection of rubella virus. When the vaccine is applied to adults, inclusive of women of childbearing age, there is also observed the increase of the serum antibody in blood, and it is noteworthy that there are observed no rubella-like symptoms which are considered to be undesirable side-effects often occurring in consequence of vaccination by the hitherto-known rubella virus vaccines. Thus, the novel and highly attenuated rubella virus vaccine of this invention can be used safely even for adults to be effectively immunized against rubella virus infection.

The safety of the highly attenuated rubella virus vaccine of the present invention will be further explained by way of examples of the following tests. Then, the present invention will be demonstrated in further details by way of examples. Throughout the specification as well as in the following tests and examples, abbreviations "g.," "ml." and "r.p.m." mean "gram(s)," "milliliter(s)" and "round(s) per minute," respectively.

TEST 1 (FETAL TOXICITY TEST IN RABBITS)

Healthy 8-month-old female Japanese white rabbits were mated, and after 8 days from the conception 1.0 ml. of a test sample was inoculated into an ear vein of the pregnant rabbits. As the test samples were used the following:

(a) Infected tissue culture fluid of non-attenuated rubella virus Strain To–336 passaged 3 times with African green monkey kidney (hereinafter may be referred to as "AGMK") cells;

(b) Highly attenuated rubella virus vaccine produced according to Example 1 detailed below;

(c) Infected tissue culture fluid of non-attenuated rubella virus Brown strain [1] passaged 5 times with AGMK cells (positive control), and (d) Non-infectious tissue culture fluid of AGMK cells (negative control).

The baby rabbits normally born from the infected mother rabbits were observed for 30 days after their birth, and then the surviving baby rabbits were sacrificed for autopsy by macroscopic and histopathological observations. The results of the observations are summarized in Table 1.

In the group (c) where the maternal infection was made with the Brown strain, only seven baby rabbits survived ---
[1] Brown strain is one of the most popular and typical wild strains of rubella virus in the United States.

among the born fifty-eight, and in four rabbits among the survived seven, there were observed typical malformations such as cataracts, defect or iris, corneal opacity, capillary invasion into cornea, staphyloma and microphthalmia, either bilateral or unilateral. In other groups (a), (b) and (d), 58, 56 and 61 baby rabbits survived, respectively, all without any appreciable malformations.

In the group (c) where the material infection was with the Brown strain, most of the 51 death cases were observed within three days subsequent to the birth, and the death rate among baby rabbits who survived for seven days after birth was at the same degree as of other groups.

TABLE 1

| | Group | | | |
|---|---|---|---|---|
| | (a) | (b) | (c) | (d) |
| Strain | To-336 | To-336 | Brown | None. |
| Passage history [1] | AGMK-3 | AGMK-25 | AGMK-5 | |
| Administration dose [2] | 4.2 | 4.3 | 3.5 | 0. |
| Number of pregnant rabbits | 10 | 8 | 8 | 10. |
| Number of baby rabbits (N) | 78 | 66 | 58 | 74. |
| Number of the baby rabbits died after birth (D) | 20 | 10 | 51 | 13. |
| Death rate (D/N) percent | 25.6 | 15.2 | 87.9 | 17.6. |
| Rate of malformations among the survived | 0/58 | 0/56 | 4/7 | 0/61. |

[1] "AGMK" means that the passages were with African green monkey kidney cells, and the figure shows the number of the passages.
[2] The dose is expressed in terms of common logarithm of 50%-interfering dose ($\log_{10} \text{InD}_{50}$).

TEST 2 (FETAL TOXICITY TEST IN MICE AND RATS)

Healthy 10 to 12-week-old female mice (CF-1) and rats (Sprague Dawley) were respectively mated, and after five days from the conception, $\text{InD}_{50}$ $10^{4.8}/0.2$ ml. of a tissue culture fluid of Rubella virus, Strain To-336, passaged 3 times with AGMK cells was inoculated intravenously into the pregnant animals. On the day before the expected day of delivery, i.e. the 19th day of pregnancy for mice and the 21st day for rats, they were cesarotomized and the festuses were picked out and subjected to macroscopic observations, including skelton stained with Dowsons' method (refer to Dowsons, A. B.; Stain Technology, 1, 123 to 124 (1926)), and histopathological findings of eyes and auditory systems. As the negative control, the non-infected tissue culture fluid was administered. The results of the observations in comparison with the negative control are summarized in Table 2, from which it is noted that the maternal infection with Strain To-336 did not give any abnormalities in the fetuses.

TABLE 2

| | Animal species | | | |
|---|---|---|---|---|
| | Mouse | | Rat | |
| Group | Control | To-336 | Control | To-336 |
| Number of pregnant animals | 7 | 9 | 12 | 12 |
| Fetal mortality (percent) (deaths/total implants) | 35.0 | 34.1 | 9.0 | 6.2 |
| Number of living fetuses | 56 | 60 | 152 | 151 |
| Fetal body weight (g.) (mean±standard error) | 1.03±0.031 | 1.10±0.063 | 3.17±0.063 | 3.22±0.097 |
| Number of fetuses with skeletal abnormalities | 0 | 0 | 0 | 0 |
| Number of fetuses with visceral defects | 0 | 0 | 0 | 0 |
| Histopathological findings of eyes and auditory systems | Normal | Normal | Normal | Normal |

TEST 3 (INOCULATION TEST IN MONKEYS)

The three groups, each consisting of five healthy African green monkeys, were respectively inoculated with the highly attenuated rubella virus vaccine which was produced in Example 1 detailed below and which shows a virus titer of at least $10^{4.0}$ $\text{InD}_{50}/\text{ml.}$:

(a) intrathalamicly (1.0 ml., 0.5 ml. each to both hemispheres);
(b) intraspinally (0.2 ml.); and
(c) intramuscularly (1.0 ml.).

The monkeys were observed for the subsequent 28 days, and then subjected to histopathological observations, whereby no abnormalities were found.

TEST 4 (SAFETY TEST)

The highly attenuated rubella virus vaccine produced according to Example 1 was subjected to tests after the manner prescribed in Section 73.114 of Public Health Service Regulations, Title 42, Part 73, U.S.A. for safety tests of "poliomelitis vaccine, live, oral," and after the manner prescribed in Section 73.73 of the same regulations for sterility tests.

As the results of inoculation tests in various animals (i.e. rabbits, adult mice, suckling mice and guinea pigs), tissue culture tests with various primary cells (i.e. monkey kidney, human, amnion, human kidney and rabbit kidney) and negative tests of adventitious agents, it was confirmed that the tested vaccine satisfied every requirement of the above-referred regulations.

EXAMPLE 1

Kidneys are removed aseptically from healthy African green monkeys. The kidneys (AGMK) are washed with Hanks' balanced salt solution [4] and are minced. The minced tissue is suspended in about 50 times by volume of a 0.25%-trypsin-supplemented Hanks' solution, and is digested under agitation. The resulting free cells are collected by centrifugation at 1,000 r.p.m. for 5 minutes, and diluted with such amount of a lactalbumin Hanks' solution,[5] to which 5% of inactivated calf serum is supplemented, that the resultant cell suspension contains about $5 \times 10^5$ cells per milliliter. The suspension is incubated stationarily in Roux bottles at 36° C. After 7 days when the cells have firmly propagated on the inside wall of the bottles, the cells are washed three times with TC medium 199 [6] to prepare an AGMK cell culture medium.

[4] Hanks' balanced salt solution consists of:

| | G. |
|---|---|
| NaCl | 8.0 |
| KCl | 0.4 |
| $CaCl_2$ | 0.2 |
| $MgSO_4 \cdot 7H_2O$ | 0.2 |
| $Na_2HPO_4 \cdot 2H_2O$ | 0.06 |
| $KH_2PO_4$ | 0.06 |
| $NaHCO_3$ | 0.25 |
| d-Glucose | 1.0 |
| Phenol red | 0.02 |

Distilled water (triple-distilled), an amount to make the total 1 liter.

[5] Lactalbumin Hanks' solution is prepared by dissolving 5 g. of lactalbumin hydrolyzate in the Hanks' balanced salt solution to make the total 1,000 ml.

[6] TC medium 199 is sterile aqueous solution adjusted to pH 7.2 containing amino acids, purine bases, pyrimidine bases, vitamins, sugars, nucleotides, inorganic salts, etc. The detailed composition is to be referred to: e.g., Morgan, J. F. et al.; Proc. Soc. Exp. Biol. Med. 73, pp. 1 to 8 (1950).

A seed virus of Rubella virus, Strain To–336, is inoculated into the cells and absorbed into the cells at 37° C. for 90 minutes. Then, the fluids are discarded, and the cells are washed three times with TC medium 199. Finally, 40 ml. of TC medium 199 to which 2% of inactivated calf serum is supplemented is added to the bottle, and incubation is carried out at 32° C. for 7 days. The culture fluid is centrifuged at 3,000 r.p.m. for 5 minutes to separate a supernatant, which is to be used as the seed virus in the next passage after dilution by 10 times by volume of TC medium 199.

In this manner, the passage with the AGMK tissue culture is repeated 24 times counted from the stage of isolation of the wild Strain To–336, to obtain a seed virus for the production of a rubella virus vaccine. The seed virus is inoculated to the cells and incubated in 40 ml. of a serum-free TC medium 199 at 32° C. for 7 days. The culture fluids are collected and immediately frozen for storage at −70° C. Another 40 ml. of a fresh serum-free TC medium 199 is added to the remaining cultured cells and the incubation is continued at 32° C. for 24 hours. The culture fluids are again collected and frozen. This procedure is repeated up to the 10th day of incubation. All of the frozen culture fluids are quickly thawed, pooled and centrifuged at 3,000 r.p.m. for 5 minutes to separate a supernatant, being a highly attenuated rubella virus vaccine. The supernatant shows a rubella virus titer of $10^{4.2}$ $InD_{50}$/ml. assayed with the system of ECHO–11 [7] and AGMK.

The product is frozen for storage at −70° C. After 100 day storage, it is thawed and diluted 3 times by volume with physiological salt solution. The diluted vaccine is subcutaneously inoculated to an arm to exhibit the desirable effect of immunization in human adults as well as in children and infants.

EXAMPLE 2

Duck embryo (referred to as "DE" hereinafter) are aseptically removed from the eggs of the 13th day of incubation and, after cutting of the head, processed in the same manner as in Example 1 to prepare a DE cell culture medium in Roux bottles. In the culture medium

[7] ECHO–11 means ECHO virus Type 11 (Gregory strain), the strain being frequently used for the infectivity assay of rubella virus.

is inoculated a seed of rubella virus, Strain To–336, passaged 20 times with AGMK cells as described in Example 1. The inoculum is incubated under the same conditions as stated in Example 1. The passage with the DE cell culture is repeated 4 times, and the culture fluids of the 4th culture is centrifuged to obtain a seed virus for the production of a rubella virus vaccine.

The seed virus is inoculated to the DE cells in Roux bottles and processed in the same manner as in Example 1 by the use of a serum-free TC medium 199, to produce a highly attenuated rubella virus vaccine. The vaccine obtained by the final centrifugation shows a rubella virus titer of $10^{4.0}$ $InD_{50}$/ml. assayed with the same system as in Example 1.

In the same manner as in Example 1, the product is frozen for storage, and thereafter thawed and used for vaccination to give satisfactory immunization in human adults as well as in children and infants.

The DE cells used as the tissue culture for the passages and the vaccine production are to be negative to the COFAL test (refer to e.g. Sarma, P. S. et al.; Virology, 23, 313 et seq. (1964).

What is claimed is:

1. A highly attenuated Rubella virus vaccine comprising:

(a) live rubella virus Strain ATCC–VR–533 subjected to at least 10 passages of cultivation in a tissue culture containing living cells of a warm-blooded animal, said cells being capable of supporting said virus, at a temperature of about 28° C. to about 36° C. and ceasing said passages when sufficient attenuation is attained.

(b) a physiologically acceptable carrier therefor, its rubella virus titer being at least $10^{2.0}$ $InD_{50}$/milliliter when diluted in inoculatable form.

2. The vaccine according to claim 1 wherein the rubella virus titer is from $10^{2.5}$ to $10^{4.5}$ $InD_{50}$/milliliter.

References Cited

Buynak et al., Journal of the American Medical Association, vol. 204, No. 3, pages 103–108, Apr. 15, 1968.

RICHARD L. HUFF, Primary Examiner